Patented Mar. 29, 1927.

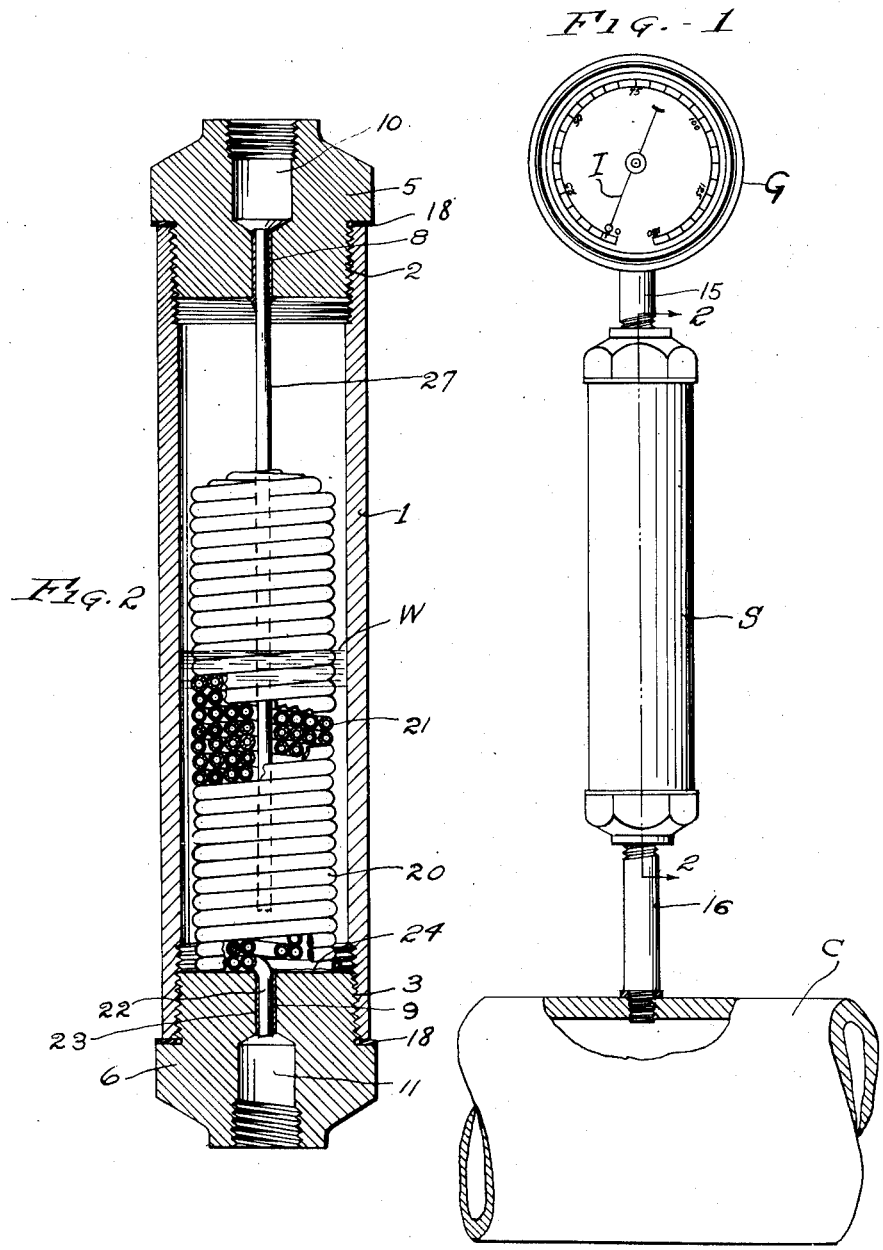

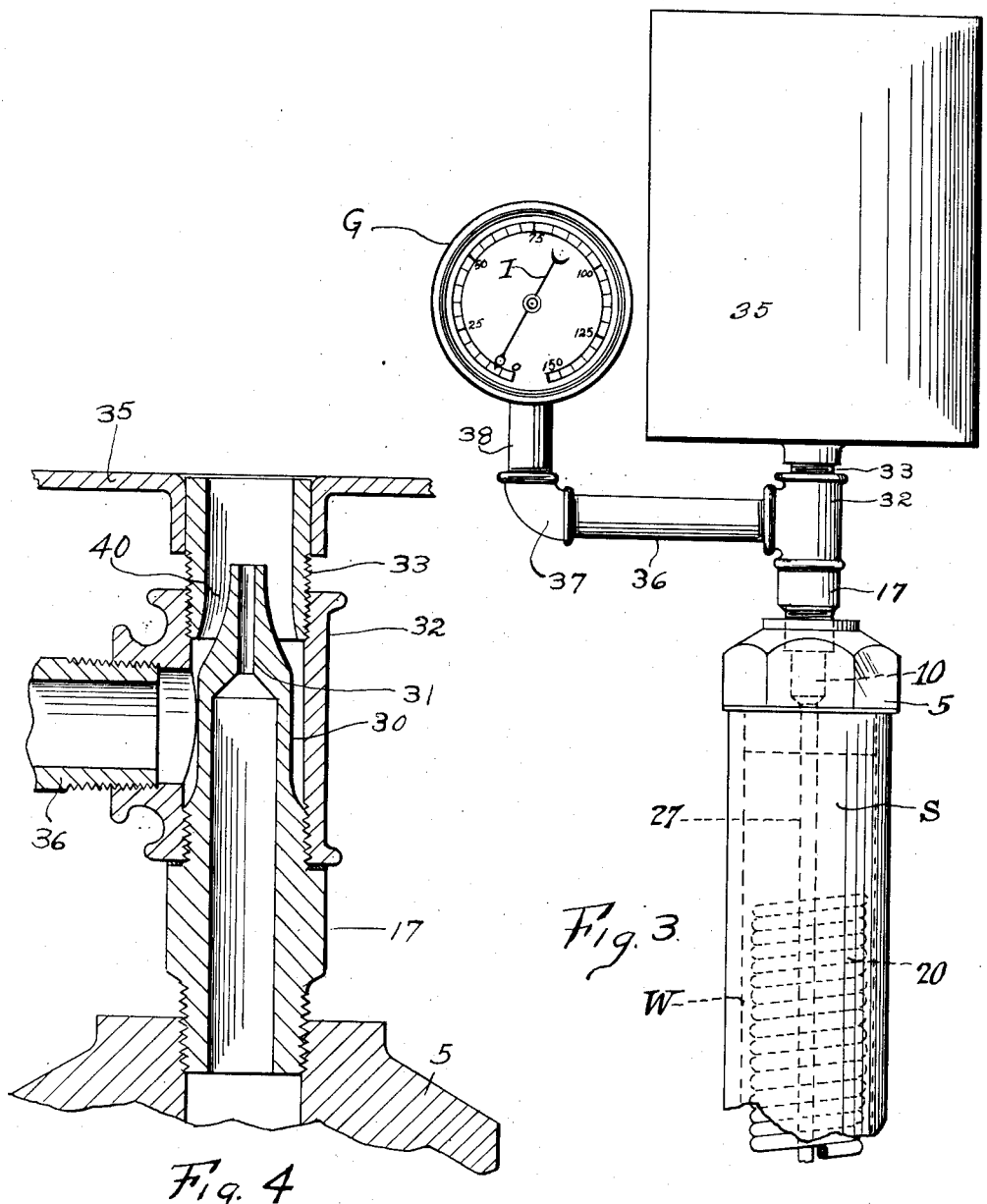

1,622,843

UNITED STATES PATENT OFFICE.

HOWARD W. PRICE, OF SWARTZ, LOUISIANA, AND JOSEPH B. MERIAM, OF CLEVELAND, OHIO, ASSIGNORS TO MERIAM COMPANY, OF CLEVELAND, OHIO, A CORPORATION OF OHIO.

PRIMARY GAUGE STABILIZER.

Application filed August 16, 1924. Serial No. 732,416.

This invention relates to stabilizers for fluid pressure gauges and has for its general object the provision of an apparatus for preventing the registration of rapid fluctuation in the pressure of a main line upon a gauge associated with the line.

A more specific object of our invention is to provide a gauge indicator stabilizing device adapted to be inserted in a gauge line extending from a main conduit to the gauge. wherein the principle of restricting the forward and backward flow of liquid by friction is combined with the principle of absorbing a part of the fluctuation by an air cushion.

Another object is the provision of a gauge stabilizer wherein a frictional resistance may be presented to the fluid flow in the gauge line and the pressure is transmitted to the gauge indirectly through a compressible fluid medium.

A further object is the construction of a compact and easily and cheaply manufactured pressure gauge stabilizer unit which may be entirely self contained and capable of being easily and rapidly assembled.

Other objects will appear in the description of our invention pertaining to the accompanying drawings and its essential characteristics will be summarized in the claims.

In the drawings, Fig. 1 is a side-elevation of our invention interposed between a conduit and a pressure gauge; Fig. 2 is a longitudinal central section taken substantially along the line 2—2 on Fig. 1; Fig. 3 is a side elevation of a modified form of our invention; Fig. 4 is a central longitudinal cross section of a portion thereof.

In order to ascertain the pressure in a conduit line it has been the general practice heretofore to connect a pressure gauge directly to a branch leading from the main line. Whenever the flow in such lines is inconstant or vibratory the intermitted stress set up in the working parts of the gauge results in shortening the period of efficiency thereof. Therefore, the problem presented and which has been solved by our invention is to interpose a device which will receive fluid from a main line under fluctuating pressure and deliver it to a gauge under constant pressure.

Our invention lies largely in combining the principle of restricting the flow of liquids or gases in a considerable length of coiled pipe of a greatly reduced diameter from that of the main line with other elements, including a fluid chamber leading from a main conduit, which will allow fluid under pressure to only partially fill the chamber, the outlet from said chamber to a fluid pressure gauge being so arranged that it shall carry only the fluid which is contained in the main conduit, and with which fluid it is assumed the gauge is designed to be used.

Referring to Fig. 1, C indicates a conduit, which we will assume contains fluid, liquid for example, under fluctuating pressure; S our stabilizer in general, and G a pressure gauge of any type such as that employing a curved tube and motion translating gearing adapted to move an indicator I, to indicate the amount of pressure in the conduit.

Our invention in its preferred form comprises a cylindrical casing 1 internally threaded at its ends at 2 and 3 for the reception of combination nuts and closure members 5 and 6. These members are apertured at 8 and 9 and counterbored and threaded at 10 and 11 for the reception of pipe or tubing such as shown at 15 and 16, and which communicate with the gauge and conduit respectively. Leading from the nut 6 through the aperture 9 into the casing, we provide capillary means, preferably consisting of a closely wound built up coil 20 of small tubing 21. The number of layers selected provides for terminating the tube close to the upper surface of the nut 6, the lower end 22 of the tube being first inserted into the opening 9 in the nut and the complete coil being then fastened rigidly to the nut as by solder indicated at 23 and 24, thus forming a convenient sub-assembly unit of the coil and nut for manufacturing.

The single tube 27 depending from the nut member 5 may be fastened therein in the same manner, as by solder. This tube preferably extends to within a short distance of the bottom of the chamber centrally of the coiled tube 21.

We prefer to provide gaskets 18 beneath each of the nuts 5 and 6 and to seal the threads 2 and 3 with some such substance as lead oxide so that there will be the least possible likelihood of disturbing the threads in installation.

In operation the fluid first enters the coil 20 and flows therethrough accumulating in the chamber to a height such as indicated at W, the air already in the chamber forming a resilient cushion above the fluid line, the amount of air space depending of course, on the amount of pressure in the main conduit. The pressure acting on the gauge is thereby stabilized both by the frictional resistance to the passage of the fluid by the walls of the primary coiled tube 20 and by cushioning effect of the air chamber as communicated to the gauge through the secondary tube 27.

In some cases the pulsations in the flow of liquid in the main line are unusually slow and here we have found that sometimes the action of the gauge follows the increase and decrease of pressure quickly enough to vacillate the gauge needle. In such cases, the air chamber should be increased in volume to provide greater cushioning effect. We have found that a very satisfactory method of increasing the air chamber consists in the additional dome and branch line to the gauge shown in Figures 3 and 4. In this modification, the connecting nipple 17 is provided with a nozzle 30 and a choked opening 31 within a T fixture 32. Threaded within this T, we have shown a short nipple 33 and secured thereto in any suitable manner, an air tank or chamber 35. The branch line 36 leading to the gauge is provided with a suitable elbow 37 and a short upright length of pipe 38.

The result obtained by this construction is an inverted Venturi effect wherein the annular aperture 40 leading backward from the end of the nozzle to the branch line leading to the gauge, forms the gradual enlargement following the decrease in area of the conduit at 31. The ingress of fluid through the opening 31 of the nozzle, incident to a slowly increased pressure, is accompanied by a sucking effect about the exterior of the nozzle with the result that while pressure is building up within the chamber 35, the direct and immediate backing up of this pressure into the gauge line is retarded and an even pressure is consequently delivered to the gauge. The equalizing of pressure attained by this Venturi action in combination with the air chamber, we have found eliminates all vacillation of the gauge, even in the case of very slow pulsation in the main line.

We claim:

1. A pressure gauge stabilizer comprising in combination, an upright casing perforated closure members at each end thereof, and a tube leading from the perforation in the bottom closure to within the casing and coiled therewithin into a compact unit, the opening of said coil being disposed adjacent the bottom closure and rigidly attached thereto and a second tubing entering the casing at the opposite closure and extending downwardly to within a short distance from the opening in said first named coil.

2. A stabilizer for a pressure gauge indicator adapted to be interposed between a conduit carrying fluid under pulsating pressure and said pressure gauge and consisting of a casing having an upper and a lower closure therein, a tube extending through the bottom closure and coiled within the casing said coil terminating with its end open near the bottom closure, and another tube leading through the other closure within the casing and extending to within a short distance of the opening at the terminus of the said coil.

3. A pressure gauge stabilizer comprising a casing having a closure member at each end, said closure members being centrally apertured, tubes mounted in each of said apertures and extending into and terminating within the casing, one of said tubes being coiled to frictionally resist the ebb and flow of liquid therethrough, and the other extending into the casing past at least a portion of the coils.

4. A primary gauge stabilizer comprising in combination a compact coil of tubing, a casing therefor, a closure member in one end of the casing, means for rigidly securing the tubing to the closure member, one end of said tubing projecting therethrough and adapted to communicate with a fluid carrying conduit, another tube one end of which extends within the casing to within a short distance from the first named closure member, and the other end of which is adapted to be connected to a pressure gauge.

5. A pressure gauge stabilier comprising a casing, closure members at each end thereof, a compact coil of tubing extending within the casing through one of the closure members, another tube extending within the casing through the opposite closure member to within a short distance of the first named closure member whereby liquid under pulsating pressure entering the casing through one of the tubes partially fills said casing and whereby air accumulating in the upper end of the casing coacts with the coil to transmit a substantially stabilized pressure to a gauge through the other tube.

6. A pressure gauge stabilizer comprising a casing, oppositely disposed closure members therefor, a tube extending within the casing through one of the closure members, and rigidly mounted thereon, another tube extending within the casing through the opposite closure member to within a short distance of the first named closure member, whereby liquid under pulsating pressure entering the casing partially fills the casing and whereby air forced ahead of said liquid and entrapped within the casing thereby accumulates in the upper end of the casing to transmit a substantially stabilized pressure through the second mentioned tube.

7. A pressure gauge stabilizer comprising a casing, capillary means within the casing adapted to communicate with a main line and to receive fluid therefrom and a tube extending within the casing and adapted to conduct fluid therefrom to a gauge.

8. A pressure gauge stabilizer comprising a casing, fluid resistance means within the casing adapted to communicate with a main line, a tube within the casing and an air chamber communicating therewith, said tube having a reduced end and a sleeve surrounding said reduced end and adapted to communicate with a gauge.

9. A pressure gauge stabilizer comprising in combination an air tight casing, a fluid resistance means disposed within the casing and adapted to communicate with a conduit containing fluid under pulsating pressure, conduit means extending within the chamber and communicating with a gauge, a venturi in said conduit means, a chamber communicating with the venturi portion of the conduit means whereby when the fluctuations in the said conduit are slow, said chamber absorbs pressure from the venturi, and the venturi restricts the flow of fluid to the gauge, thereby augmenting the stabilizing effect of the said fluid resistance means.

10. A pressure gauge stabilizer comprising a casing, fluid resistance means comprising a coil of relatively small size tubing within the casing and adapted to communicate with a conduit containing fluid under pulsating pressure, a conduit extending from the casing and a restricted nozzle connected thereto, a hollow member surrounding the nozzle and forming in effect with the nozzle a venturi, a fluid chamber, and a pressure gauge, the former being in open communication with the nozzle and the latter with the hollow member, whereby said chamber absorbs slow pulsations in pressure from the nozzle, and the hollow member restricts the flow from the nozzle and chamber into the gauge.

In testimony whereof, we hereunto affix our signatures.

HOWARD W. PRICE.
JOSEPH B. MERIAM.